F. E. BALDWIN.
MINER'S LAMP.
APPLICATION FILED MAY 16, 1913.
1,094,358
Patented Apr. 21, 1914.
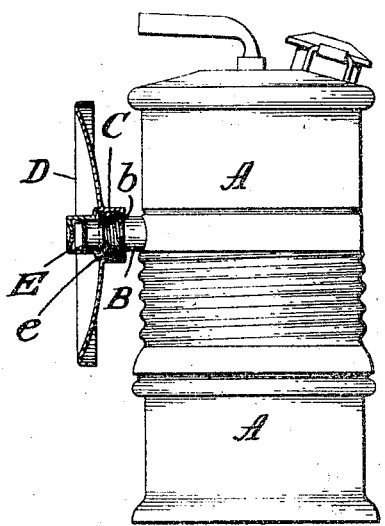
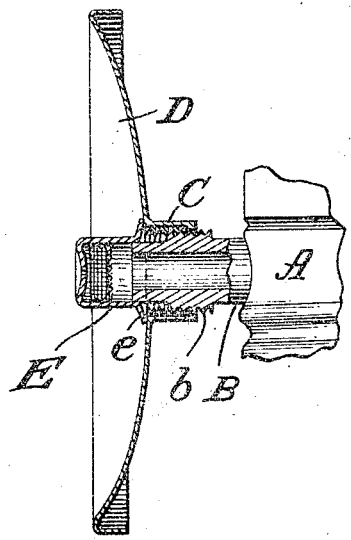
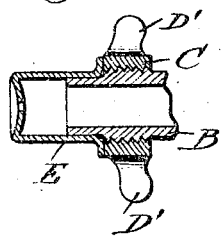
Attest:
Frederic E. Baldwin Inventor:
by
Atty

UNITED STATES PATENT OFFICE.

FREDERIC E. BALDWIN, OF NEW YORK, N. Y.

MINER'S LAMP.

1,094,358.

Specification of Letters Patent. Patented Apr. 21, 1914.

Application filed May 16, 1913. Serial No. 767,971.

*To all whom it may concern:*

Be it known that I, FREDERIC E. BALDWIN, a citizen of the United States, and a resident of Richmond borough, New York city, and State of New York, have invented certain new and useful Improvements in Miners' Lamps, of which the following is a specification.

My invention relates to that class of lamps in which acetylene or some other gas is used as the burning fluid; and more particularly lamps of a size adapted for use in mines and on automobiles, bicycles and other vehicles. Lamps of this class are usually subjected to severe use and constant shaking and the burner often becomes clogged or broken. Under these conditions, it is necessary, on the one hand, that the burner be securely held in place and, on the other hand, that it may be easily removed and replaced. The object of my invention is to provide a lamp of the above mentioned type with a burner, or burner tip, which can be readily removed and replaced without the use of any tools and yet so firmly held in position that it cannot be knocked off or jarred off by a blow or a fall, and cannot be pulled off by hand.

With the above principal object in view my invention consists in the features, details of construction and combinations of parts which will first be described in connection with the accompanying drawing and then particularly pointed out.

In the drawings, Figure 1 is a side elevation partly in section of an acetylene lamp embodying the best form of the invention. Fig. 2 is an enlarged sectional view of the burner tube and reflector shown in Fig. 1, the burner being partly removed. Fig. 3 is a detail view of another modification of the invention.

Referring to the drawings, A indicates a usual form of lamp body, B is a burner tube which in the present example projects from the lamp body; D is a reflector and E is a burner. The burner E is fitted tightly to the burner tube and held firmly to the same by friction only. While the particular manner in which this frictional connection may be made may be varied, in the best embodiment of the invention the burner is fitted tightly onto or over the end of the burner tube. By means of this strong frictional connection of the burner with the burner tube, it may be quickly and readily pushed or forced onto the end of the burner tube, and yet will hold with sufficient force to satisfy the requirements of service. Owing to the difficulty of applying sufficient force uniformly around the edge of the burner by the fingers only, the burner cannot be removed or withdrawn readily by hand. Therefore, suitable means is provided for pushing the burner from the tube, this means being located between the burner and the lamp body. In the best embodiment of the invention this burner-removing means is rotatable with relation to the axis of the burner tube and is so arranged that when rotated it will push the burner from its tube. In the best form of the invention illustrated in the drawing, the burner-removing means is as follows: The burner tube is provided with a nut, indicated at C, which has a screw-threaded engagement with the burner-tube as indicated at *b*, and its front edge bears against the rear edge of the burner. By rotating this nut in the direction of unscrewing it from the tube, it is caused to travel longitudinally outward and thereby forces the burner off the tube.

In the best embodiment of the invention as applied to a lamp having a reflector, the reflector D is connected to the nut, so that the said reflector forms a convenient leverage device or hand-wheel for rotating the nut C. In order to give a good bearing of the nut on the burner, the latter may have its inner edge flanged outward as shown. It will be obvious that by this construction, it is only necessary to rotate the nut by the reflector in the direction of unscrewing the nut in order to remove the burner, whereupon the nut is screwed back, and the burner, after being cleaned—or a new one, if necessary—may be forced onto the end of the tube. It is obvious that these operations may be performed very quickly, do not require any skill or delicacy of manipulation and do not necessitate the use of tools.

Another form of leverage device for rotating the burner-removing means is illustrated in Fig. 3, this consisting of wings D' secured to or forming part of the nut C, this modification being particularly useful where no reflector is necessary.

I claim:—

1. In a lamp, the combination, with a burner tube, and a burner frictionally held to said tube, of rotatable means mounted upon the tube and arranged when rotated in one direction to push the burner from the tube.

2. A lamp provided with a burner frictionally held upon the burner tube, and a lifting nut threaded upon said tube, and adapted to remove said burner from said tube by the mere unscrewing of the nut.

3. In a lamp, the combination, with a burner-tube, and a burner frictionally held to said tube, of a burner-removing device rotatable around said burner-tube, and means arranged to actuate said burner-removing device.

4. A lamp provided with a burner frictionally held upon the burner tube, and a reflector provided with a nut threaded upon the burner tube back of said burner and adapted to remove said burner by pressure exerted thereon by said nut when unscrewing.

5. A lamp provided with a burner frictionally held upon the burner tube, and having a rim or excrescence projecting therefrom, and a lifting nut threaded upon said tube, and adapted to remove said burner from said tube by the mere unscrewing of the nut.

FREDERIC E. BALDWIN.

Witnesses:
W. P. PREBLE,
E. M. DOUGHTY.